United States Patent [19]

Auriemma

[11] 3,735,841
[45] May 29, 1973

[54] BRAKE LOCKING AND RELEASE SYSTEM

[75] Inventor: Nicholas A. Auriemma, Miami, Fla.
[73] Assignee: Universal Oil Products Company, Des Plaines, Ill.
[22] Filed: Mar. 10, 1972
[21] Appl. No.: 233,607

[52] U.S. Cl. .................................................. 188/5
[51] Int. Cl. ............................................. B60t 1/14
[58] Field of Search .................................. 188/5–7; 254/86 R

[56] References Cited

UNITED STATES PATENTS 2,712,366  7/1955  Skupas ..................................... 188/5
2,847,092  8/1958  Noyes et al. ............................. 188/5

Primary Examiner—Duane A. Reger
Attorney—James R. Hoatson, Jr., William H. Page II and Philip T. Liggett

[57] ABSTRACT

A pivoted lever arm, through connecting linkage means to a pivoted rocker member, provides for the locking movement of a brake member. A second, alongside, lever arm provides for lifting the first said lever arm back to a brake released position. One embodiment uses extended rod members such that there can be a foot operation for each pivoted lever arm and the entire assembly is particularly adapted for use on a serving cart or other rollable unit.

4 Claims, 4 Drawing Figures

PATENTED MAY 29 1973 3,735,841
Figure 3
Figure 1
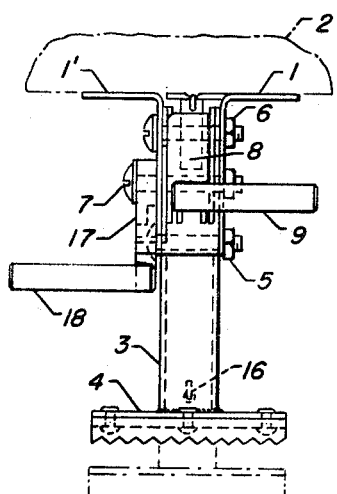
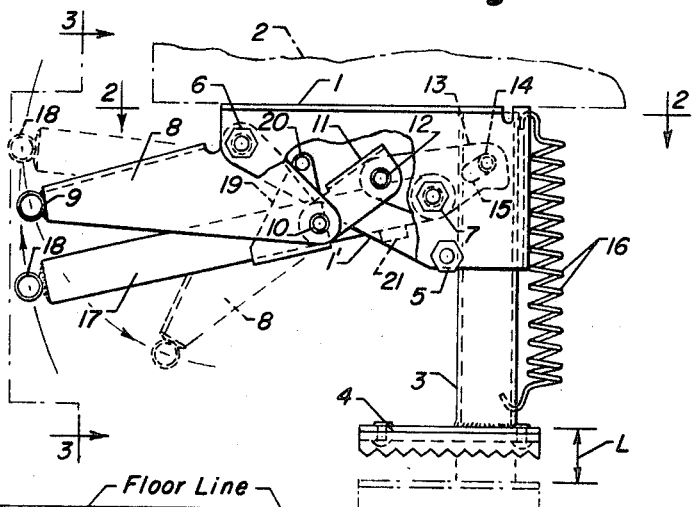
Figure 4
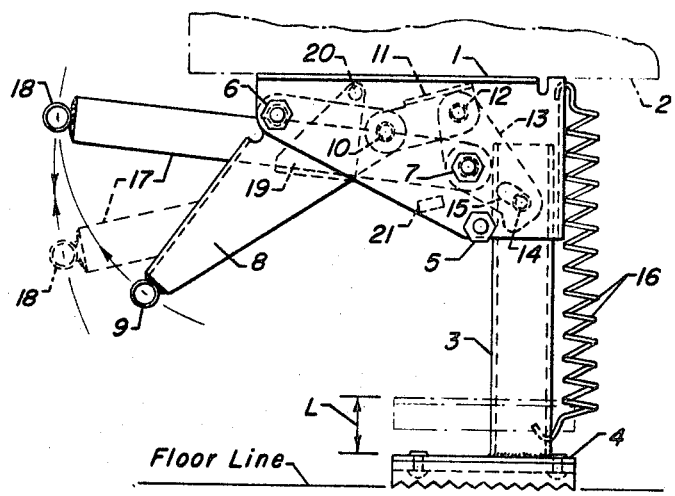
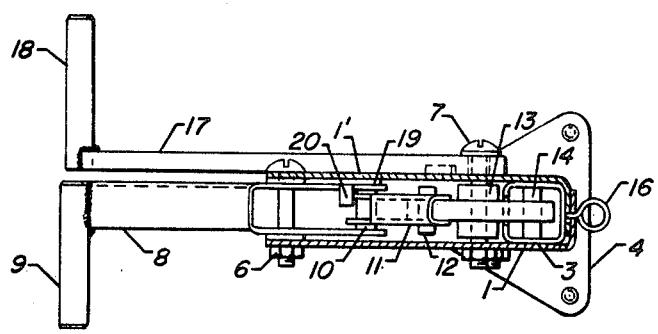
Figure 2

BRAKE LOCKING AND RELEASE SYSTEM

The present invention relates to a brake assembly using one pivoted lever arm to effect the actuation and locking of a brake member while a separate side-by-side pivoted lever arm provides a return movement and release of the first lever arm.

The braking system may be attached to, or applied to, various types of movable or rollable units; however, it is particularly useful for attachment to the lower or underside portion of a wheeled serving cart. The brake unit is also particularly suited for being foot operated.

Braking units, or assemblies, have been made in a multiplicity of ways. One customary type of construction will lock one or more wheels of a wheeled cart, chair, table, or whatever; while another type of system will provide a locking pad or member to engage the floor and preclude any rolling movement. Braking or locking actions have also been accomplished by hand movements as well as by foot action; however, many of the known types of brake systems have provided either a locking movement or a release action which was cumbersome to operate or was rather inaccessible.

It is a principal object of this invention to provide a simplified form of brake system with a minimum of moving parts for the locking or braking portion and, in addition, a release arm which is directly alongside of the brake applying arm.

In a broad aspect, the present invention provides a brake system for a wheeled unit, which comprises in combination: (a) a bracket type support means to hold and support said brake assembly; (b) a pivoted actuating lever arm for applying a brake member; (c) a central pivot connection for said lever arm to said support means and a pivoting connection between a portion of said arm and a connecting link member, whereby said link member is moved responsive to any movement of said lever arm; (d) said link member positioned in a generally end-to-end relationship with said lever arm and additionally pivotally linked at its opposing end to one end of a pivoted rocker member; (e) said rocker member fixedly pivoted at a central point to said support means and having a slidable and pivotable pin connection to a movable brake member at an end opposite the link connection to thereby provide back and forth movement to such brake member; (f) guide means for said brake member and spring means between said support means and an end portion of said brake member to biasly oppose the brake applying movement of the assembly and to assist in the release of the brake member; (g) a pivoted release lever arm with a fixed pivot connection at one end thereof to said support means; (h) last said lever arm being positioned in a close side-by-side relationship with first said lever arm and the linkage from the latter to said rocker member; and (i) a projection member from said release lever arm positioned to engage a portion of said actuating lever arm, whereby the latter can be moved and pivoted to in turn pull on said link member and thereby tip said rocker member and release the brake member.

Typically, the brake assembly will be mounted underneath or alongside of a wheeled cart, table, work cabinet, or other unit which has rollers or wheels that will permit the unit to have undesirable movement at those times when it is desired to keep the unit in a stationary position. Since the brake assembly is adapted to be underneath a cabinet or cart and the like, it is especially designed to require a minimum of vertical heighth. The brake system is also particularly designed to have bars which can be contacted by foot pressure; however, the same brake system might well utilize hand operation from hand levers which in turn connect through suitable linkage means to the lower brake assembly actuating the brake foot or pressure pad that is designed to contact the floor and preclude movement of the rollable unit.

Another feature of the present design and assembly resides in the fact that most of the parts may be fabricated from sheet metal and there is the substantial elimination of machined parts, castings or other items which are normally more expensive to fabricate.

Reference to the accompanying drawing and the following description thereof will serve to illustrate one embodiment of the present improved form of brake assembly, as well as ease of installation thereof, and the advantages which are obtained from the use of the simplified form of construction.

FIG. 1 of the drawing is a diagrammatic elevational view showing the assembly of the various parts to provide the brake locking and release system.

FIGS. 2 and 3 of the drawing show, respectively, a plan view and an end elevational view of the brake assembly.

FIG. 4 of the drawing shows another elevational view of the assembly, where the brake actuating lever means has been operated to move the brake member into contact with the floor.

Referring now particularly to FIGS. 1, 2 and 3 of the drawing, there is shown the use of two spaced bracket support means 1 and 1' which are in turn adapted to be bolted or otherwise attached to the lower or underside portion of a wheeled cart, table, or whatever, indicated at 2. One end portion of the spacing between bracket means 1 and 1' forms a three-sided channel to encompass a movable tubular member 3 which in turn connects with a pad member 4 to form the braking member for the system. In other words, as best shown in FIG. 2, the bracket members 1 and 1' form a U-shaped guide portion for the tubular member 3 such that the latter can move up and down between the spaced bracket means. A bolt member 5 with spacer means between bracket means 1 and 1' as well as bolt members at pivot points 6 and 7 provide for the spacing and bolting together of the two opposing spaced apart bracket members 1 and 1'. Typically, the pad 4 will be of a soft spongy nature, as of foam rubber, or foam plastic, so as to hold to a floor surface or to carpeting and also permit some compression to accommodate unevenness in the floor itself.

Pivotally held between bracket members 1 and 1', at a pivot point and bolt means 6, is a brake actuating lever arm member 8 which in turn has a foot holding rod 9 at one end and an opposing extended portion for holding a pin or bolt member 10. The latter in turn pivotally connects to a link member 11 which has a pin or bolt member 12 at its opposing end to pivotally connect with a rocker arm member 13. The latter is pivotally supported by the pin or bolt member 7 which extends through the bracket members 1 and 1' to be supported thereby. The rocker arm member 13 becomes the brake actuating member by virtue of its roller or pin type connection with the upper portion of shaft portion 3 for the brake member. In other words, a pin or roller 14 extends through the shaft portion 3, as best shown in FIG. 2, and in turn passes through a slotted opening 15 within the rocker member 13 such that as the latter is pivoted to have the shaft connecting portion move downwardly it will, in turn, through the roller 14, cause a downward movement of the brake shaft 3. Conversely, when the brake release member is actuated as will hereinafter be described, the upward movement of the rocker arm member 13 will lift against the pin member 14 to result in the lifting of the shaft 3 and the floor pad member 4.

With particular reference to FIG. 2 of the drawing, as well as FIG. 1, it will be seen that the actuating lever arm 8 connects through pin means 10 to the link means 11 in a substantially end-to-end arrangement and, similarly, the link member 11 connects through the pin means 12 to the inner end portion of rocker arm member 13 in an end-to-end arrangement. Each of the arm members, as well as link members 11, are contained between the bracket support members 1 and 1' and are generally centered therein. There is also indicated a tension spring member 16 positioned vertically along the end portion of the bracket means 1 to connect between a fixed point of the upper end of the bracket means 1 and a lower portion of the brake member 3. Thus, there can be spring biasing to oppose the downward movement of the brake as there is locking action to engage the floor while at the same time the spring can serve to assist in the return motion of the brake member when it is being lifted from its floor engaging position.

In addition to the brake actuating arm 8 there is an elongated brake release arm 17 having a foot engaging rod means 18. This arm 17 is utilized to maintain contact with the actuating arm 8 and bring about a release of the brake locking position. The release arm 17 is pivotally connected at its one end to the fixed position bolt means 7 and in a location that is outside of bracket support means 1'; however, a vertical plate member 19 with projection means 20 is attached to the underside portion of arm 17, by the use of a L-shaped section, such that there may be engagement between the projecting pin member 20 and an edge portion of arm member 8. There is also indicated in FIG. 1 of the drawing the locating of a stop member 21 from the exterior side of bracket support member 1' such that arm 17 can come to rest against such stop member and not fall to contact the floor. It will be further noted, particularly in FIG. 2, that the plate member 19 which, in effect connects the projection 20 to the arm 17, is adapted to fit along the inside of bracket member 1' and adjacent an outer face of arm member 8. This arrangement permits the projecting pin 20 to be inside of the confines of the bracket support members 1 and 1' and effect the desired engagement with an edge portion of arm member 8.

With particular reference to FIG. 4 of the drawing, there is shown the positioning of parts where arm member 8 has been pushed downwardly so as to pivot about pin member 6 and raise the position of pin 10, as well as link member 11, such that pin 12 effects a rocking movement of rocker arm 13 about fixed bolt member 7 whereby there is a resulting downward movement of a slotted portion 15 in rocker arm 13 and a corresponding pressure against pin 14 to cause brake shaft 3 to move downwardly. The latter, in turn, provides engagement of brake pad 4 with the floor under the cart or other type of movable unit.

In comparing the positioning of arm members and link members between FIGS. 1 and 4, it will be seen that pin member 14 has moved from a position above center in FIG. 1 (or the horizontal with respect to pin position 7) to a lowered and locked position below center in FIG. 4. In other words, there is an override past the center line which causes the movement of the brake member to go from the unlocked position to the brake locking position. It will also be noted in FIG. 4 of the drawing that the projection member 20 has been lifted vertically by virtue of the actuating arm 8 being pushed downwardly from the foot rod end. The lifting of projection member 20, in turn, will cause the lifting of the interconnected release arm 17 as the latter moves about its end pivot point connection with bolt member 7. However, subsequently, when it is desired to effect a release of the braking action, there can be a pushing downward of lever arm 17 (as viewed in FIG. 4) and this will cause a corresponding downward pushing contact between projection member 20 and a side portion of arm member 8 such that the latter in turn pivots about bolt means 6 to be moved back to the position being shown in FIG. 1 of the drawing. The repositioning of arm 8 in turn pulls upon link means 11 and rocker arm 13 so as to lift up on the brake shaft member 3 a distance L, whereby the pad portion 4 is lifted from the floor. It should be further noted that as the brake member 3 is lifted an amount to override the center line of movement between pin means 14 and the pivot bolt 7, there is a rapid snap-action lifting of the braking member from the floor by virtue of the tension spring 16 assisting in the lifting of the brake member. The entire assembly then returns to the positioning shown in FIG. 1 so that the brake system is again ready for use after the cart, table, or whatever wheeled unit involved, has been moved to a new location.

It is to be noted that the particular configurations and construction details for the individual parts which have been set forth or shown in the present drawing are merely diagrammatic and should in no way be limiting with respect to final designs or means of fabrication. For example, arm member 8, as well as link member 11, have been indicated as being formed into U-shaped members from a single sheet metal section. On the other hand, rocker member 13 has been indicated as the cast or formed from solid metal sections, with a central hub portion serving as a spacer around bolt member 7 and between bracket portions 1 and 1'. Also, the bracket or support means 1 and 1' are merely diagrammatic in that they may vary in size and/or flanging aspects to suit different types of carts, tables, cabinets, etc. The use of the L-shaped form of bracket support means is merely one convenient form and is in no way limiting. Still further, the brake shaft member 3 can be made of a solid rod or bar and it should not be limited to being of a hollow square tubular form as indicated on the drawing.

It is, however, a particular feature of the present invention to make use of separate actuating and release lever arms and to have the end-to-end linkage arrangement for the actuating arm whereby there is a minimum of spacing involved in effecting the movement of a pivot rocker arm that will effect the application of the brake member into a locking position and the subsequent release thereof. Spring biasing is of a particular advantage in providing limited resistance to the brake locking motion as well as providing a spring assistance in effecting the unlocking or release action for the brake member. However, different forms of spring members could be used and various positions for the spring means may well be utilized to effect the desired spring biasing to accompany the override movement of the rocker arm and the pin means connecting it to the brake member.

I claim as my invention:

1. A brake system for a wheeled unit, which comprises in combination:
   a. a bracket type support means to hold and support said brake assembly;
   b. a pivoted actuating lever arm for applying a brake member;
   c. a central pivot connection for said lever arm to said support means and a pivoting connection between a portion of said arm and a connecting link member, whereby said link member is moved responsive to any movement of said lever arm;
   d. said link member positioned in a generally end-to-end relationship with said lever arm and additionally pivotally linked at its opposing end to one end of a pivoted rocker member;
   e. said rocker member fixedly pivoted at a central point to said support means and having a slidable and pivotable pin connection to a movable brake member at an end opposite the link connection to thereby provide a back and forth movement to such brake member;
   f. guide means for said brake member and spring means between said support means and an end portion of said brake member to biasly oppose the brake applying movement of the assembly and to assist in the release of the brake member;
   g. a pivoted release lever arm with a fixed pivot connection at one end thereof to said support means;
   h. last said lever arm being positioned in a close side-by-side relationship with first said lever arm and the linkage from the latter to said rocker member; and
   i. a projection member from said release lever arm positioned to engage a portion of said actuating lever arm, whereby the latter can be moved and pivoted to in turn pull on said link member and thereby tip said rocker member and release the brake member.

2. The brake system of claim 1 further characterized in that said spring means comprises an elongated tension spring connecting between said bracket support means and a portion of said movable brake member.

3. The brake system of claim 1 further characterized in that said brake member includes a movable-hollow shaft member and pin means through the latter passes through and connects with a slotted opening in an end portion of said rocker member, whereby pressure from the latter effects the back and forth movement of the brake member.

4. The brake system of claim 1 further characterized in that said pivot release lever arm is pivoted about a pivot position which is identical with the pivot point for said rocker arm member and the projection member from said release lever arm extends from a plate member connective with said release lever arm member, with the plate member in turn being positioned between a side portion of the actuating lever arm and an interior face portion of the support means whereby there is vertical alignment maintained for the pivoted release lever arm and the projection member therefrom.

* * * * *